April 5, 1938.   P. E. MOORE   2,112,859
WHEEL AND AXLE ASSEMBLY
Filed March 4, 1935
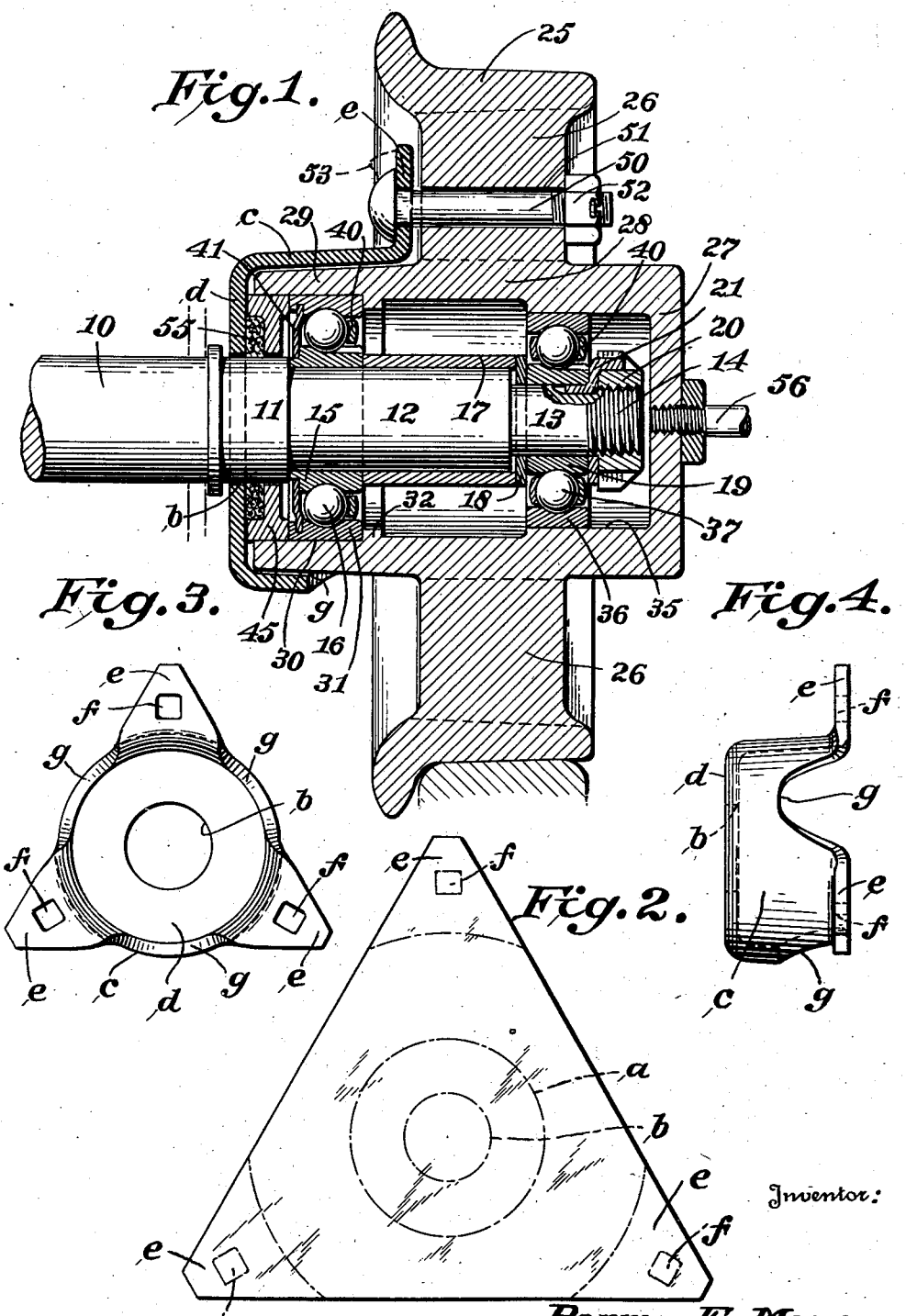

Patented Apr. 5, 1938

2,112,859

UNITED STATES PATENT OFFICE 2,112,859

WHEEL AND AXLE ASSEMBLY

Perry E. Moore, Knoxville, Tenn., assignor to The Sanford Investment Company, Knoxville, Tenn., a corporation of Delaware Application March 4, 1935, Serial No. 9,328

17 Claims. (Cl. 295—41)

This invention relates to improvements in wheel and axle assemblies and more particularly concerns a simply and cheaply constructed arrangement which is particularly adapted for employment with anti-friction bearings.

One of the features of the present invention is the provision of a drawn metal cap member cooperative with wheel and axle structures for retaining them in assembled condition.

Another feature of the present invention is the provision of such a device in combination with packing and spacing means for establishing an assembly which is tight both in the mechanical sense and against the escape of lubricant.

Further features of the invention relate to the manner of making and assembling the steel cap, to the general combination of the assembly of parts, and to the various details as will appear more fully in the course of the following specification and claims.

The present assembly is of the same general nature as that set out and claimed in the co-pending application of Hugh W. Sanford, Serial No. 652,737, filed January 20, 1933.

An illustrative form of practicing the invention is set out on the accompanying drawing, in which:

Fig. 1 is a diametrical sectional view showing a wheel and axle assembly including the present invention.

Fig. 2 is a view showing the blank from which the pressure cap is made.

Figs. 3 and 4 are respectively end and side views of the cap after being formed.

In the drawing, the axle 10 has a cylindrical surface 11 spaced from its end, a second and smaller cylindrical surface 12, a third and yet smaller cylindrical surface 13, and a threaded portion 14 at the end. The inner or axle race 15 of an anti-friction bearing having illustratively the balls 16, is seated on the cylindrical portion 12 and bears against the shoulder between the portions 11 and 12. A spacer sleeve 17 surrounds the remainder of the cylindrical portion 12 and preferably extends slightly beyond its end and engages with a pressure washer 18 which is guided by the smallest cylindrical portion 13. The inner or axle race 19 of a second anti-friction bearing surrounds the smallest cylindrical portion 13. This assembly is clamped tightly together by a nut 20 which is threadedly engaged with the threaded portion 14 of the axle. It is preferred to introduce a lock washer 21 having two fingers, one of which is engaged with a groove in the cylindrical portion 13 to prevent the washer from turning relative to the axle, and the other finger being engaged in one of a series of notches in the periphery of the nut 20. It will be noted that when the nut 20 is tightened, the bearings and spacers are clamped tightly together and upon the axle.

The wheel is shown as being of flanged type and comprising a tread portion 25 having spokes 26 connecting it integrally with a hollow hub which includes the closed outer end 27, a central portion 28, and an inwardly projecting portion 29 extending beyond the inner surfaces of the spokes and in the present illustration likewise extending inwardly beyond the plane which is tangent to the inward surfaces of the wheel flanges. The hollow hub has a cylindrical internal surface 30 adjacent its inner end, for receiving the outer or hub race 31 of the first said anti-friction bearing; adjacent this surface 30 is an abutment 32 for limiting the relative movement of the hub with respect to the race 31, and being here illustrated as a simple peripheral rib of internal diameter large enough for passing a second hub race 36. At the outer end, the hollow hub is provided internally with a cylindrical surface 35 for receiving the outer or hub race 36 of the second anti-friction bearing which has illustratively the bearing balls 37. It will be noted that this hub race 36 is not clamped, and hence this second anti-friction bearing assembly is able to adjust itself while the wheel and axle are being brought together; and the end thrust is accepted by and transmitted through the first anti-friction bearing assembly.

These anti-friction bearings are illustrated as having cage members 40; and the inner or first anti-friction bearing, adjacent the open or inner end of the hub, is preferably provided with a lubricant seal 41 fixed to the hub race thereof; and each bearing assembly is self-contained and self-supporting against relative axial displacements of the axle and hub races.

The hub race 31 of the inner or first anti-friction bearing is pressed tightly against the abutment 32 by a pressure ring 45 which is guided by the surface 30 of the hollow hub, and has an inwardly extending portion closely fitting but spaced from the cylindrical portion 11 of the axle.

The pressure ring 45 is held in position by a pressure cap. This pressure cap is manufactured from a triangular blank as shown in Fig. 2, normally being of a mild steel which can be smoothly drawn into shape. The drawing operation comprises pressing the area within the larger circle (a) of Fig. 2 relatively out of the plane of the rest of the sheet of the blank, and thus drawing metal from the area adjacent the circle (a) to form a cup (Figs. 3 and 4) which is deeper than the distance from the circle (a) to the adjacent side of the blank, along with operations for maintaining or assuring to the three corners of the original blank, a position substantially parallel to the plane of the area within the circle (a).

As a result of these operations, and the precedent or subsequent formation of an aperture corresponding to the circle (b) of Fig. 2, the resilient steel cap of Figs. 3 and 4 is produced, having the peripheral wall (c) which preferably is slightly conical to conform to the usual conical external shape of the projecting portion 29 of the hollow hub, a flat end portion (d) comprising the portion of the blank between the circles (a) and (b), and the three projecting ears (e) each of which has an aperture (f) which is illustrated as rectangular to receive the correspondingly shaped portion of a carriage bolt 50 (Fig. 1). These bolts are passed through apertures 51 formed in the corresponding spokes 26 of the wheel, so that the nuts 52 are at the outer or exposed face of the wheel and are readily accessible for the placing or removal of locking keys, and for the placing or removal of the nuts themselves. Thus, these bolts may be tightened or released without any access to the inner face of the wheel at all. If desired, the extreme corners of the steel cap may be bent over as shown by the bends 53 (Fig. 1) to retain the belts against undue axial movement with respect to the cap. It is particularly pointed out that the presence of the gaps (g) permits the use of a relatively thick piece of metal in the blank, while assuring a considerable resiliency in the assembly, and so that the clamping is facilitated.

The pressure ring 45 provides a portion of a groove which is open adjacent the cylindrical portion 11 of the axle. The remaining portion of this groove is provided by the portion (d) of the cap. Within this groove is located a packing or sealing material 55 which may be a simple or reinforced felt washer, bearing against the cylindrical portion 11 and thus completing the seal of the bearing structure and assembly against the exit of lubricant. Lubricant may be supplied at the closed end 27 of the hub by the device 56 illustrated.

In assembly for this illustrated form, the cap, packing, and pressure ring are placed upon the axle end. The anti-friction bearings are then assembled upon the axle, and clamped tightly by nut 20. The wheel is slid on, the hub race of the second anti-friction bearing floating along the surface 35, and the hub race of the first anti-friction bearing being brought against the abutment 32. The pressure ring, packing, and cap are aligned during this operation; and the nuts 52 are positioned and drawn tight. The depth of the peripheral wall (c) is illustrated as less than the total projection inward from the axially aligned parts of the wheel structures (that is, the sum of the axial length of the hub extension from the inner surfaces of the spokes 26 or limiting surface of the annular recess at the inner face of the wheel, plus the projection of the ring 45), so that the ears and cup wall effect a tight resilient clamping; and, further, the parts are so proportioned, as shown, that the combined axial length of the hub race 30 and the pressure ring 45 is greater than the spacing of the abutment 32 from the inner end of the hub extension, so that the ring 45 projects and the bottom of the cup-like member c is never engageable with the end of the hub extension. It is especially to be remarked that the first anti-friction bearing is clamped tightly, rather than adjusted; so that all assembly operations may be performed by a relatively unskilled workman, without danger of having the bearing too tight or too loose.

The cap may be manufactured in quantity very cheaply; and although of particular value when employed with factory-assembled vehicles, it is also capable of substitution for present or damaged equipment, as a repair structure either with or without the pressure ring 45 and packing 55.

It is obvious that the invention is not limited to the specific embodiments shown, but that it may be employed in many ways within the scope of the appended claims.

I claim:
1. A wheel and axle assembly comprising a wheel having a hollow hub with an extension at the inner face of the wheel, an axle in said hub, anti-friction bearing means located between the axle and hub, means on the axle for holding a part of said bearing means against axial movement relative to the axle, an abutment in the hub, and resilient pressure means including a part extending around the hub extension for maintaining another part of said anti-friction bearing means engaged with said abutment.

2. A wheel and axle assembly comprising a wheel having a hollow hub with an extension at the inner face of the wheel, an axle in said hub, anti-friction bearing means located between the axle and hub, means on the axle for holding a part of said bearing means against axial movement relative to the axle, an abutment in the hub, and resilient pressure means for maintaining another part of said anti-friction bearing means engaged with said abutment, and including at least one element extending around and guided by said hub extension and including resilient portions, and also including means for drawing said resilient portions toward the wheel.

3. A wheel and axle assembly comprising a wheel having a hollow hub with an extension at the inner face of the wheel, an axle in said hub, anti-friction bearing means located between the axle and hub, means on the axle for holding a part of said bearing means against axial movement relative to the axle, an abutment in the hub, a pressure ring guided by said extension, a resilient steel plate cup member engaging said ring and extending around the hub extensions, and threaded means for securing said member to the wheel.

4. A wheel and axle assembly comprising a wheel having a hollow hub with an extension at the inner face of the wheel, an axle in said hub, anti-friction bearing means located between the axle and hub, means on the axle for holding a part of said bearing means against axial movement relative to the axle, an abutment in the hub, and resilient clamping means for maintaining another part of said anti-friction bearing means engaged with said abutment; said resilient clamping means including a cup-like member engaging over the hub extension and having resilient ears extending away from the hub free of the wheel structure, and devices for drawing said ears axially toward the wheel structure.

5. A wheel and axle assembly comprising a wheel having a hollow hub with an extension at the inner face of the wheel, an axle in said hub, anti-friction bearing means located between the axle and hub, means on the axle for holding a part of said bearing means against axial movement relative to the axle, an abutment in the hub, and resilient clamping means for maintaining another part of said anti-friction bearing means engaged with said abutment; said resilient clamping means including a cup-like member engaging over the hub extension and having resilient ears extending away from the hub free of the wheel structure, said ears having apertures, and carriage bolts having their shoulder portions received in the apertures to prevent rotation of each said bolt about its axis, the bolts extending through the wheel structure, and the nuts being located for easy access at the outer face of the wheel.

6. A wheel and axle assembly comprising a wheel having a hollow hub with an extension at the inner face of the wheel, said wheel being recessed at its inner face between the hub and the tread, an axle in said hub, anti-friction bearing means located between the axle and hub, means on the axle for holding a part of the bearing means against axial movement relative to the axle, an abutment in the hub, and resilient pressure means for maintaining another part of said anti-friction bearing means engaged with said abutment; said pressure means including a cup-like structure extending over the hub extension and having resilient peripheral flange means adjacent the base of the hub extension in spaced relation to axially aligned portions of the wheel and located in the recess portion of the wheel, and clamping devices engaged with said flange means and said wheel.

7. An assembly as in claim 6, in which the flange means comprise peripherally spaced ears.

8. A wheel and axle assembly comprising a wheel having a hollow hub with an extension at the inner face of the wheel, an axle in said hub, anti-friction bearing means located between the axle and hub, means on the axle for holding a part of said bearing means against axial movement relative to the axle, an abutment in the hub, and clamping means for maintaining another part of said anti-friction bearing means in engagement with said abutment; said clamping means including a cup-like member engaging over the hub extension and having a flange portion at its outer end extending radially away from the hub extension, said flange portion having an aperture and the inner face of said flange portion being located along the length of said hub extension when said cup-like member is in working position, and a device engaged with the wheel and flange portions and extending through said aperture for drawing said flange portion axially toward the wheel structure.

9. A wheel and axle assembly comprising a flanged wheel having a hollow hub with an extension at the inner face of the wheel and recessed between the wheel flange and the hub extension, an axle in said hub, anti-friction bearing means located between the axle and hub, means on the axle for holding a part of said bearing means against axial movement relative to the axle, an abutment in the hub, and clamping means for maintaining another part of said anti-friction bearing means in engagement with said abutment; said clamping means including a cup-like member engaging over the hub extension and having flange portions at its outer end extending radially away from the said hub extension, at least a part of each flange portion being located within the recessed wheel so that the outer faces of said flange portions are spaced outwardly from the plane of the inner face of the wheel flange when the said cup-like member is in working position, and devices engaged with the wheel and with said flange portions for drawing said cup-like member axially onto said hub extension for effecting the clamping of said other part of the anti-friction bearing.

10. A wheel and axle assembly comprising a flanged wheel having a hollow hub with an extension at the inner face of the wheel and recessed between the wheel flange and the hub extension, an axle in said hub, anti-friction bearing means located between the axle and hub, means on the axle for holding a part of said bearing means against axial movement relative to the axle, an abutment in the hub, and clamping means for maintaining another part of said anti-friction bearing means in engagement with said abutment; said clamping means including a cup-like member engaging over the hub extension and having resilient flange portions at its outer end extending radially away from the said hub extension, at least a part of each flange portion being located within the recessed wheel so that the outer faces of said flange portions are spaced outwardly from the plane of the inner face of the wheel flange when the said cup-like member is in working position, and devices engaged with the wheel and with said flange portions at points spaced from the hub extension for drawing said cup-like member axially onto said hub extension for effecting the clamping of said other part of the anti-friction bearing.

11. A wheel and axle assembly comprising a wheel having a hollow hub with an extension at the inner face of the wheel and recessed between the wheel flange and the hub extension, an axle extending into said hub, antifriction bearing means located between the axle and hub, means on the axle for holding a part of said bearing means against axial movement relative to the axle, an abutment in the hub, and resilient clamping means for maintaining another part of said anti-friction bearing means engaged with said abutment; said resilient clamping means including an integral cup-like member engaging over the hub extension and having radially extending resilient flange means adjacent its outer end, annular pressure means extending within the hub for engaging the said other part of the anti-friction means and projecting inwardly from the hub extension for engagement by the cup-like member, and devices for drawing said flange means axially toward the wheel structure; said wheel, hub extension, abutment, cup-like member, and pressure means being constructed and arranged so that the flange means is located at least in part in the recess and all portions of the cup-like member are free of limiting axial engagement with the hub extension.

12. A wheel and axle assembly comprising a wheel having a hollow hub with an extension at the inner face of the wheel, an axle extending into said hub, anti-friction bearing means located between the axle and hub, means on the axle for holding a part of said bearing means against axial movement relative to the axle, an abutment in the hub, and clamping means for maintaining another part of said anti-friction bearing means engaged with said abutment; said clamping means including an integral cup-like member engaging over the hub extension and having radially extending flange means adjacent its outer end, annular pressure means extending within the hub for engaging the said other part of the anti-friction means and projecting inwardly from the hub extension for engagement by the cup-like member, and devices for drawing said flange means axially toward the wheel structure; said wheel, hub extension, abutment, cup-like member, and pressure means being constructed and arranged so that all portions of the cup-like member are free of limiting axial engagement with the hub extension.

13. A wheel and axle assembly comprising a wheel structure having a hollow hub with an extension at the inner face of the wheel, an axle in said hub, anti-friction bearing means located between the axle and the hub, means on the axle for holding a part of said bearing means against axial movement relative to the axle, an abutment in the hub, and clamping means for maintaining another part of said anti-friction bearing means engaged with said abutment; said clamping means including a cup-like member engaging over the hub extension and having a flange portion extending away from the hub free of the wheel structure, devices for drawing said flange portion axially toward the wheel structure, said cup-like member having an aperture through which the axle extends, and a pressure member located wholly inside the cup-like member for pressing against the said other part of the anti-friction bearing and itself having a portion cut away at its inner face adjacent said axle, together with a sealing means engaged with the axle and received at said cut-away portion and between the cup-like member and pressure member.

14. As an article of manufacture, a closure cap for an open end of the wheel hub of an anti-friction wheel and axle assembly, comprising a resilient drawn metal cup-like structure having an annular side wall and a bottom wall connected to one end of the side wall and apertured to receive the axle and having an annular portion around the aperture for engaging and resiliently pressing an anti-friction bearing into engagement with the wheel, outwardly turned flange ears attached at the other end of said side wall and extending approximately parallel to the said bottom wall, said ears being spaced apart along the periphery of the side wall, said flange ears having apertures for receiving members for clamping said closure cap to the wheel.

15. As an article of manufacture, a closure cap for an open end of the wheel hub of a wheel and axle assembly, comprising a resilient metal cup-like structure having an annular side wall and a bottom wall connected to one end of the side wall, said bottom wall being apertured to receive the axle and having an annular portion for engaging and resiliently pressing an anti-friction bearing into engagement with the wheel, a plurality of spaced outwardly-turned resilient flange ears attached at the other end of said side wall and extending approximately parallel to the said bottom wall, said flange ears having apertures spaced from the annular side wall for receiving members for clamping said closure cap to the wheel, said annular side wall being in part cut away at the spacing between the said flange ears to provide a stiff integral structure adjacent the bottom wall for stiffening and supporting the annular portion thereof and to provide spaced portions integral with said flange ears for assuring the desired resiliency under the action of the clamping members for holding the anti-friction bearing tightly engaged with the wheel.

16. A wheel and axle assembly comprising a wheel structure having a hollow hub with an extension at the inner face of the wheel, an axle in said hub, anti-friction bearing means located between the axle and the hub, means on the axle for holding a part of said bearing means against axial movement relative to the axle, an abutment in the hub, and clamping means for maintaining another part of said anti-friction bearing means engaged with said abutment; said clamping means including an apertured cup-like member extending around the axle and having an annular bottom portion, a side wall portion and an outwardly extending flange portion, said annular bottom portion being effective for pressing said other part of the anti-friction bearing means against the abutment, said side wall portion including a part extending outside of and around the hub extension, said flange portion extending away from the hub free of the wheel structure, and devices for drawing said flange portion axially toward the wheel structure.

17. A wheel and axle assembly comprising a wheel structure having a hollow hub with an extension at the inner face of the wheel, an axle in said hub, anti-friction bearing means located between the axle and the hub, means on the axle for holding a part of said bearing means against axial movement relative to the axle, an abutment in the hub, and clamping means including an apertured resilient metal cup-like member extending around the axle and having an annular bottom portion, a side wall portion and an outwardly extending flange portion, said annular bottom portion being effective for passing said other part of the anti-friction bearing means against the abutment, said side wall portion including a part extending outside of and around the hub extension, said flange portion being located at the outer end of the side wall portion and extending radially away from the hub extension with the inner face of said flange portion being located along the length of said hub extension when said cup-like member is in working position whereby the resiliency of said cup-like member is effective for maintaining the engagement of the anti-friction bearing means with said abutment, and a device engaged with the wheel and with the flange portion for drawing said flange portion axially toward the flange structure.

PERRY E. MOORE.